United States Patent
Suzuki

(10) Patent No.: US 10,623,672 B2
(45) Date of Patent: *Apr. 14, 2020

(54) IMAGE SENSORS WITH POWER SUPPLY NOISE REJECTION CAPABILITIES

(71) Applicant: SEMICONDUCTOR COMPONENTS INDUSTRIES, LLC, Phoenix, AZ (US)

(72) Inventor: Kazuhisa Suzuki, Urayasu (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/955,528

(22) Filed: Apr. 17, 2018

(65) Prior Publication Data

US 2018/0241956 A1      Aug. 23, 2018

Related U.S. Application Data

(63) Continuation of application No. 15/262,146, filed on Sep. 12, 2016, now Pat. No. 9,979,912.

(51) Int. Cl.
| | |
|---|---|
| *H04N 5/361* | (2011.01) |
| *H04N 5/369* | (2011.01) |
| *H04N 5/335* | (2011.01) |
| *H04N 5/357* | (2011.01) |
| *H04N 5/378* | (2011.01) |

(52) U.S. Cl.
CPC ............ *H04N 5/361* (2013.01); *H04N 5/335* (2013.01); *H04N 5/357* (2013.01); *H04N 5/3575* (2013.01); *H04N 5/3698* (2013.01); *H04N 5/378* (2013.01); *H04N 5/3577* (2013.01)

(58) Field of Classification Search
CPC ...... H04N 5/361; H04N 5/378; H04N 5/3698; H04N 5/3575; H04N 5/335; H04N 5/357; H04N 5/3577

See application file for complete search history.

(56) References Cited

U.S. PATENT DOCUMENTS

| | | | |
|---|---|---|---|
| 8,466,991 B2 | 6/2013 | Mo et al. | |
| 8,531,591 B2 * | 9/2013 | Okamoto | H04N 5/357 348/241 |
| 8,570,412 B2 | 10/2013 | Yanagita et al. | |
| 9,979,912 B2 * | 5/2018 | Suzuki | H04N 5/335 |

(Continued)

*Primary Examiner* — Luong T Nguyen
(74) *Attorney, Agent, or Firm* — Treyz Law Group, P.C.; Tianyi He

(57) ABSTRACT

An image sensor may include an array of pixels having an active pixel. The active pixel may generate image signals in response to incident light. The image sensor may also include a power supply and booster circuitry. The power supply may provide a powers supply voltage signal, which has a first noise component, to the active pixel. The booster circuitry may provide a control signal, which has a second noise component that is the inverted version of the first noise component, to the active pixel. The control signal with the second noise component may be used to reject the first noise component, which is an unwanted noise component (e.g., power supply noise). The booster circuitry may include an operational amplifier, capacitors, and switches coupled to two input terminals and one output terminal of the operational amplifier in various configurations.

16 Claims, 8 Drawing Sheets

(56) References Cited

U.S. PATENT DOCUMENTS

| | | | |
|---|---|---|---|
| 2004/0262492 A1* | 12/2004 | Matsuda | H01L 27/14618 250/208.1 |
| 2005/0068438 A1 | 3/2005 | Kozlowski | |
| 2005/0189470 A1 | 9/2005 | Purcell et al. | |
| 2008/0258047 A1* | 10/2008 | Sakakibara | G01J 1/44 250/214 C |
| 2010/0238336 A1 | 9/2010 | Okamoto et al. | |
| 2010/0271247 A1 | 10/2010 | Lee et al. | |
| 2011/0248149 A1* | 10/2011 | Sato | H04N 5/374 250/214 P |
| 2012/0307117 A1* | 12/2012 | Sato | H04N 5/378 348/294 |
| 2016/0286145 A1 | 9/2016 | Demonte et al. | |

\* cited by examiner

IMAGE SENSORS WITH POWER SUPPLY NOISE REJECTION CAPABILITIES

This application is a continuation of U.S. patent application Ser. No. 15/262,146, filed Sep. 12, 2016, which is hereby incorporated by reference herein in its entirety. This application claims the benefit of and claims priority to U.S. patent application Ser. No. 15/262,146, filed Sep. 12, 2016.

BACKGROUND

This relates generally to imaging devices, and more particularly, to imaging devices having power supply noise rejection capabilities.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out analog image signals from the image pixels. Power supplies (e.g., voltage sources) are used to provide a power supply voltage to image pixels to drive any relevant circuitry.

A regulator circuit can be used to distribute and provide power to image pixels, but such a configuration with a single regulator circuit can require a high input supply voltage, which is not desired. A booster circuit can be used in combination with the regulator circuit to reduce the input supply voltage. However, there is a tradeoff between the booster circuit's ability to provide an incremental amount of power (e.g., to supply a corresponding voltage) and output noise. In other words, when the booster circuit generates a high voltage, the high voltage usually includes a large noise component.

Because the output noise of the booster circuit propagates through the circuitry within the image pixels, the power supply noise corresponds to the output noise of the booster circuit. To meet the power demands of the image pixels, a large amount of power supply noise is produced by the booster circuit. The power supply noise produced by the regulator and booster circuit combination and supplied to the image pixels are detrimental to the operations of the image sensor.

It would therefore be desirable to be able to provide imaging devices with power supply noise rejection capabilities.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
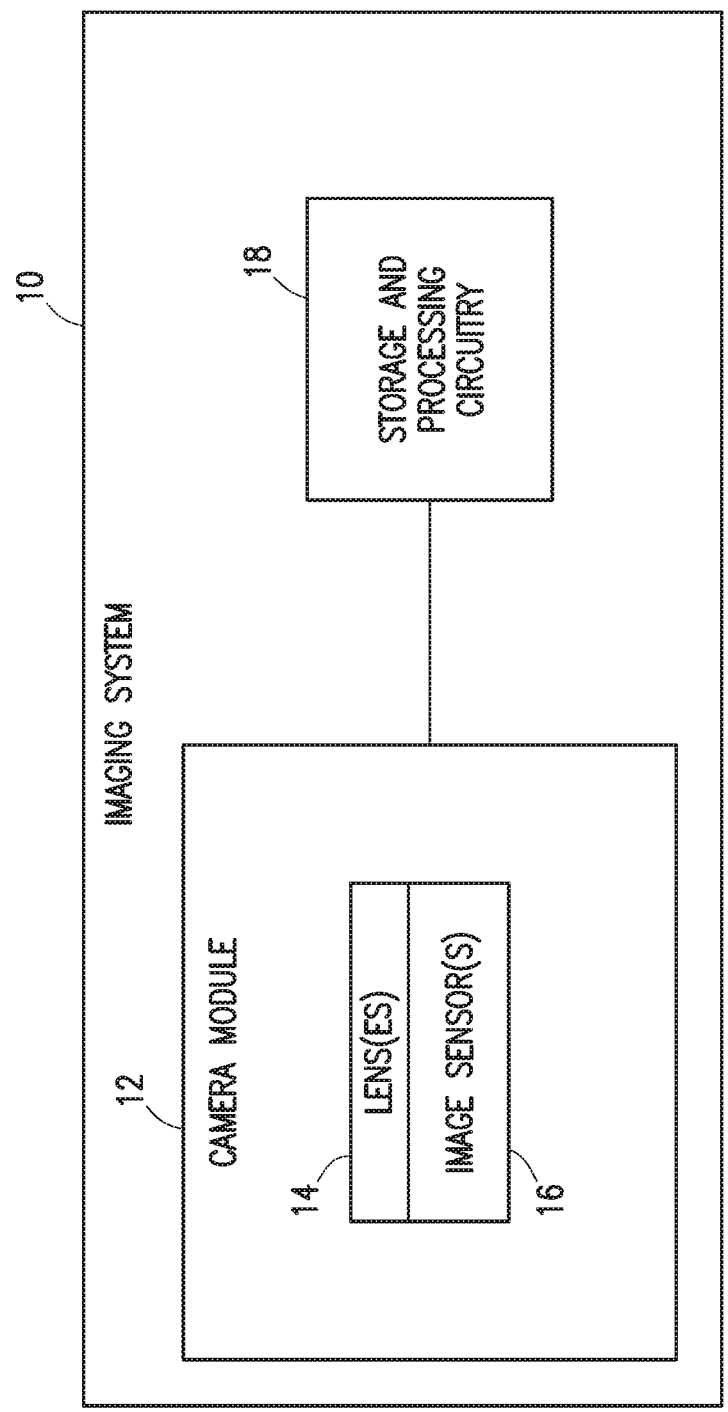
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
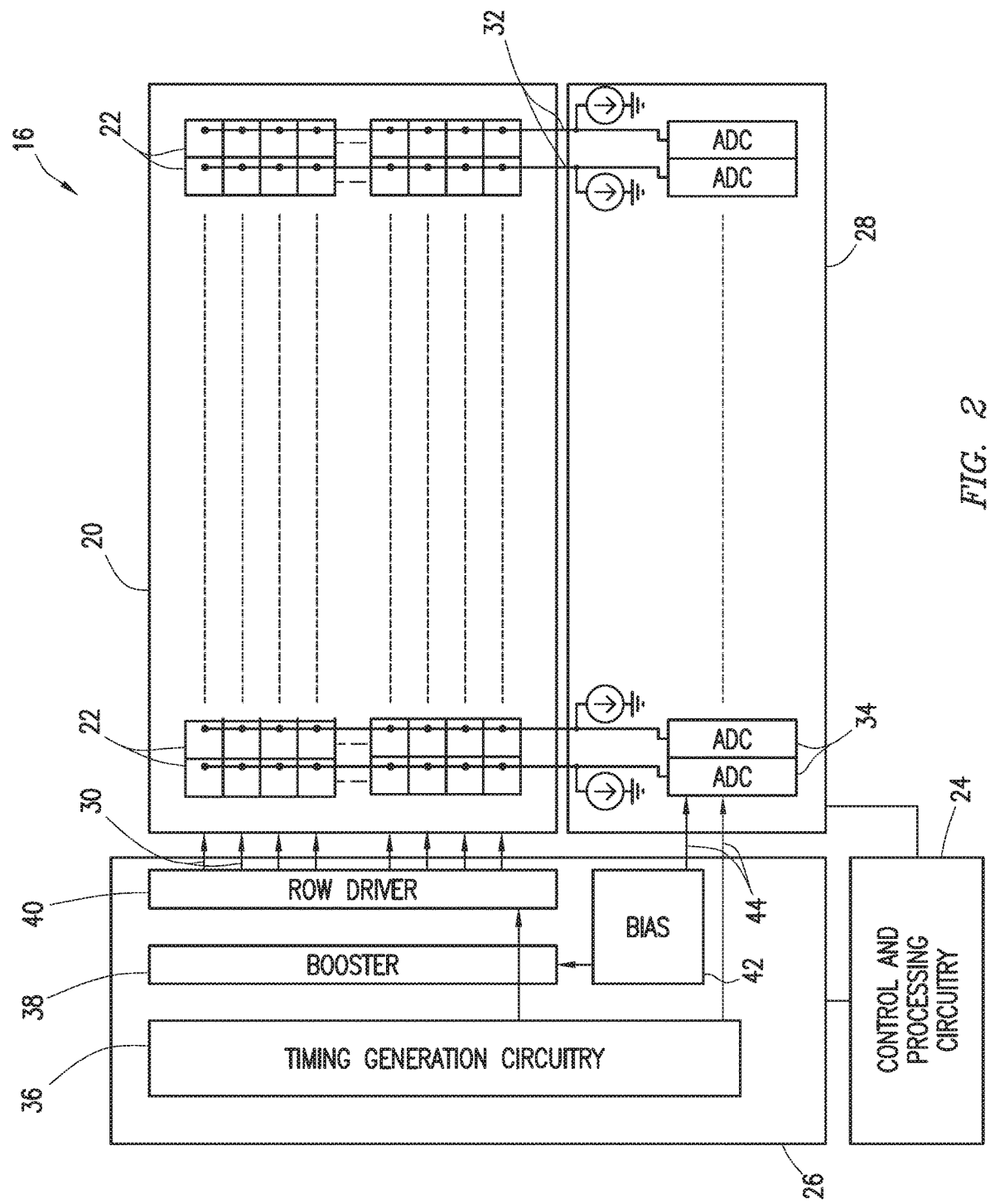
FIG. 2 is a diagram of an illustrative pixel array coupled to booster circuitry in accordance with an embodiment.

As shown in FIG. 2, image sensor 16 may include a pixel array 20 having image sensor pixels 22 (sometimes referred to herein as image pixels or pixels) arranged in rows and columns and control and processing circuitry 24. Array 20 may include, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital converter (ADC) circuitry such as circuitry 34, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry 34 in readout circuitry 28 may convert analog pixel values received from array 20 into corresponding digital pixel values (sometimes referred to as digital image data or digital pixel data). Circuitry downstream of ADC circuitry 34 may further process the digital pixel data. Image readout circuitry 28 may supply digital pixel data to control and processing circuitry 24 and/or processor 18 (FIG. 1) for pixels in one or more pixel columns. For example, digital correlated double sampling processing may take place downstream of ADC circuitry 34. This is merely illustrative, if desired, other processing operations may occur downstream or upstream from ADC circuitry 34.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Row control circuitry 26 may include timing generation circuitry 36, booster circuitry 38, row driver circuitry 40, and bias circuitry 42. If desired, bias circuitry 42 and timing generation circuitry 36 may be included within control and processing circuitry 24 because bias circuitry 42 and timing generation circuitry 36 communicate with both row-wise circuitry (e.g., booster circuitry 38 and row driver circuitry 40) and column-wise circuitry (e.g., ADC circuitry 34). If timing generation circuitry 36 and bias circuitry are within row control circuitry, they may communicate with image readout circuitry 28 via lines 44.

Timing generation circuitry 36 may be coupled to readout circuitry 28 to generate timing control signals for operating image pixels 22 (e.g. timing control signals during image signal readout). Timing generation circuitry 36 may also be coupled to row driver circuitry 40 for relaying various control signals (e.g., source follower transistor control signal, transfer transistor control signal, etc.) according to a timing schedule of desired operations. Bias circuitry 42 may be coupled to booster circuitry 38 and readout circuitry 28 to provide a bias voltage (e.g., ground voltage, reference voltage, etc.) when desired (e.g., when driving an image signal off of pixel array 20). Booster circuitry 38 may be coupled to row driver circuitry 40 to provide voltage signals (e.g., bias voltage signals) or control signals to respective rows of image pixels 22. The voltage and control signals may be conveyed to pixel array 20 via row control paths 30 or additional paths (not shown). Booster circuitry 38 may receive an input reference voltage from bias circuitry 42 to provide a bias voltage to pixel array 20. If desired, booster circuitry 38 may receive any number of input voltage from bias circuitry 42 to generate any number of bias voltages and/or control signals for pixels within array 20. In other words, control signals and supply voltage signals for circuitry within array 20 may be generated using timing generation circuitry 36, booster circuitry 38, and row driver circuitry 40.

Booster circuitry 38 may include a high booster circuit and a low booster circuit. Row driver circuit 40 may include two three-terminal switch for each control signal and/or supply voltage signal for each of pixels 22 in each respective row. A first switch may have a first terminal coupled to a corresponding control signal or supply voltage signal for a corresponding pixel in a corresponding row. A second terminal of the first switch may be coupled to the high booster circuit. A third terminal of the first switch may be coupled to a switch control signal. A second switch may have a first terminal coupled to the same corresponding control signal or supply voltage signal for a corresponding pixel in a corresponding row. A second terminal of the second switch may be coupled to the low booster circuit. A third terminal of the second switch may be coupled to a switch control signal. In such a configuration, booster circuitry 38 may provide a given voltage difference between the high booster circuit and the low booster circuit. The given voltage difference may be provided to the third terminal of the switch and conveyed to a desired terminal within a desired pixel. Alternatively, a first switch may represent an ON signal for a control signal, and a second switch may present an OFF signal for the control signal, or vice versa.

Image sensor 16 of FIG. 2 is merely illustrative. Some features within image sensor 16 (FIG. 1) are omitted in FIG. 2 for clarity reasons. If desired, additional features may also be included within image sensor 16 to provide addition functionalities. As an example, array 20 may include optically dark pixels (e.g., black pixels, not shown in FIG. 2) that do not collect image signals from incident light. Dark pixels may be shielding from incident light using a shielding structure. Any suitable shielding structure may be used to prevent incident light form reaching photosensitive regions of the dark pixels. Alternatively, photosensitive region on dark pixels may be disabled using any desired method to make dark pixels insensitive to incident light. Dark pixels may be used for digital correction and/or as a physical guard band surrounding active pixels. Alternatively, dark pixels may be formed in any desired pattern.

Figure 3:
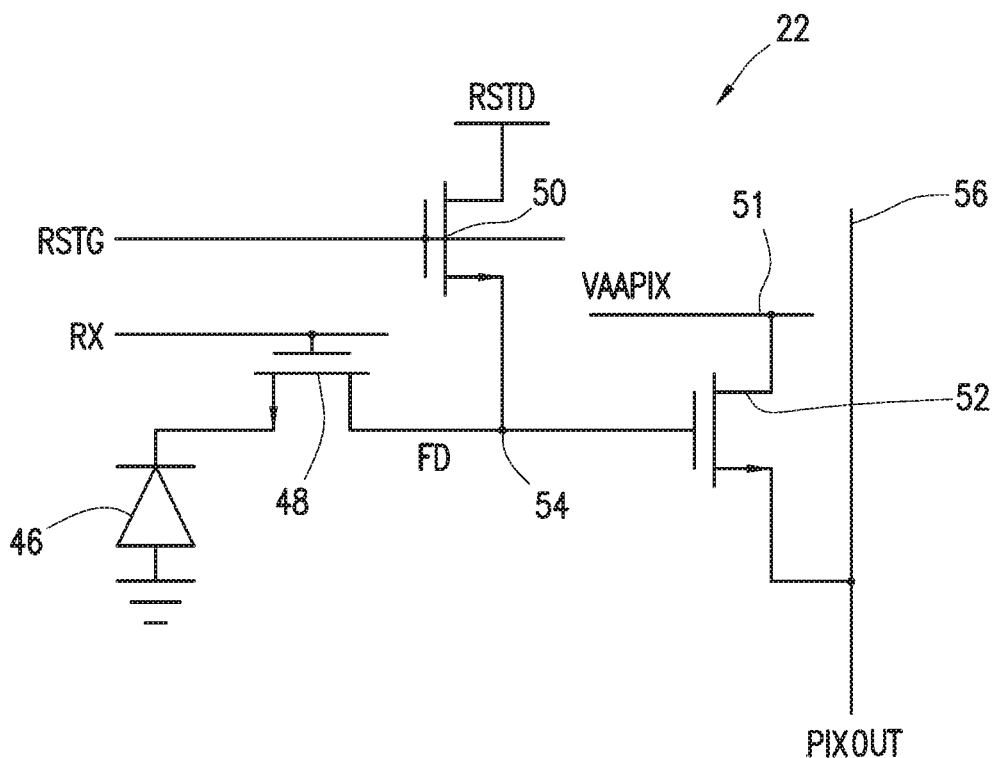
FIG. 3 is a circuit diagram of an illustrative image pixel in accordance with an embodiment.

FIG. 3 is a circuitry diagram for an illustrative image sensor pixel 22. Pixel 22 may include photosensitive region 46 (e.g., photodiode 46). Photodiode 46 may receive incident light over a period of time (e.g., exposure time) and generate an image signal corresponding to the incident light over the exposure time. Pixel 22 may also include transfer transistor 48, reset transistor 50, and source follower transistor 52. Pixel 22 may further include a row select transistor (not shown) or any other desired transistors to enable additional capabilities.

Transfer transistor 48 may have a gate that is controlled by a transfer control signal TX. Transfer transistor 48 may couple photodiode 46 to floating diffusion region 54 (sometimes referred to herein as floating diffusion 54 or floating diffusion node 54). When transfer control signal TX is asserted, the image signal generated at photodiode 46 may be transferred to floating diffusion region 54. Reset transistor 50 may have a gate that is controlled by a reset control signal RSTG. Reset transistor 50 may couple a voltage supply providing reset voltage RSTD to floating diffusion 54. Prior to asserting control signal TX, the voltage at floating diffusion region 54 may be reset to reset voltage level RSTD by asserting reset control signal RSTG. If desired, reset control signal may also be asserted at another time to reset the voltage at floating diffusion region 54. Source follower transistor 52 may have a gate terminal coupled to floating diffusion region 54. Source follower transistor may couple power supply 51 providing supply voltage VAAPIX (e.g., supply voltage signal VAAPIX) to output line 56. During readout operations, output line 56 may provide image signal PIXOUT to readout circuitry external to array 20. Image signal PIXOUT may correspond to an image signal voltage level at floating diffusion region 54. If desired, output line 56 may also provide reset signal PIXOUT to readout circuitry external to array 20. Reset signal PIXOUT may correspond to a reset signal voltage level at floating diffusion region 54.

In an operating mode for image sensor pixel 22, during shuttering, floating diffusion region 54 and photosensitive region 46 are first both reset (using transistors 48 and 50) to a reference voltage level (e.g., voltage level RSTD). Next, photosensitive region 46 accumulates charge according to incident light during an exposure period. In a correlated double sampling scheme, floating diffusion region 54 is reset again (using transistor 50) and read out through output line 56 (during reset conversion) and digitized by ADC circuitry 34. Next, accumulated charge at photosensitive region 46 is transferred to floating diffusion region 54 (using transistor 48). The accumulated charge at floating diffusion region 54 is then read out through output line 56 (during signal conversion) and digitized by ADC circuitry 34. Further processing (e.g., comparing reset level single to image level signal, etc.) may take place using the two signals read out.

If desired, pixel 22 may also include a row select transistor, an anti-blooming transistor, a storage diode, additional photosensitive elements or any other structures that are suitable for the operation of pixel 22.

Figure 4:
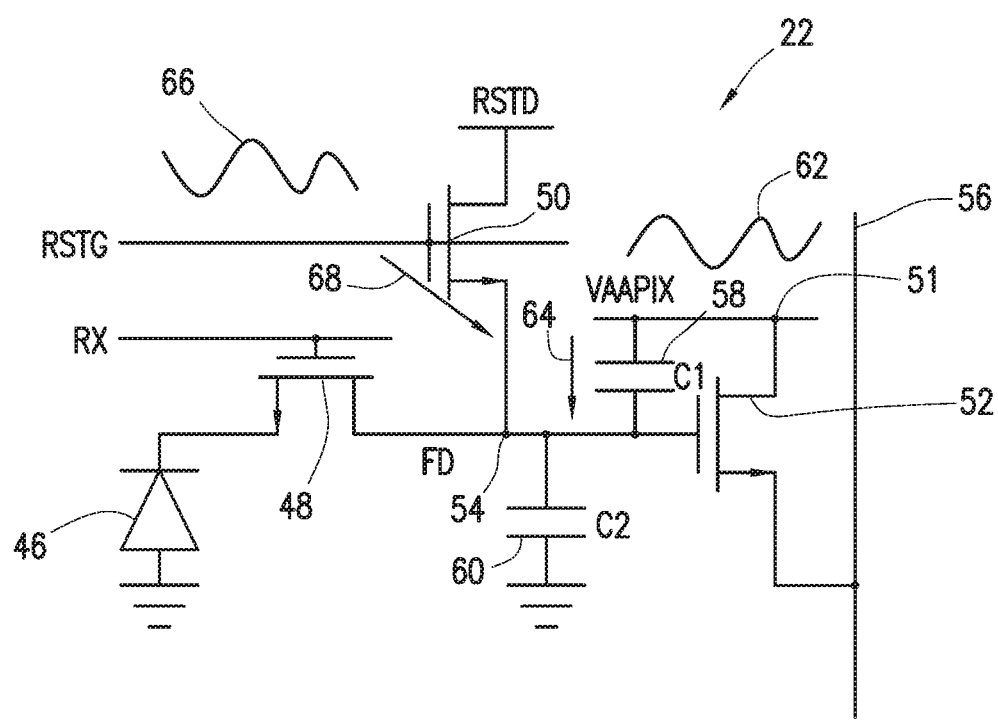
FIG. 4 is a circuit diagram of an illustrative image pixel of the type shown in FIG. 3 having a noise canceling signal as an input for cancelling out the power supply noise in accordance with an embodiment.

Floating diffusion region 54 may be a doped-semiconductor region (e.g., a doped silicon region formed in a silicon substrate by ion implantation, impurity diffusion, or other doping techniques) that has a charge storage capability. This charge storage capability is depicted in FIG. 4 as capacitor 60 having a capacitance C2. FIG. 4 is a circuit diagram for an illustrative image sensor pixel having capacitors 58 and 60. Some features in FIG. 4 have already been described in connection with the analogous features in FIG. 3 and will not be further discussed as to not obscure the highlighted features within FIG. 4.

Pixel 22 may include parasitic capacitance C1 depicted as capacitor 58. Parasitic capacitance C1 may be generated as a result of the close proximity of power supply 51 (providing voltage VAAPIX) to floating diffusion region 54. In other words, the proximity of metal routing providing supply voltage VAAPIX may contribute to the parasitic capacitance. Such a coupling between the power supply and floating diffusion region 54 degrades power supply noise rejection ratio (PSRR). PSRR is a measure of a circuit's power supply's rejection expressed as a log ratio of output noise to input noise. PSRR for circuitry external to array 20 may be compensated using external circuitry. However, PSRR contributions within pixels in array 20 may dominantly affect image sensor performance. Additionally, parasitic capacitance C1 may further include the capacitive coupling between the gate terminal and one of the source-drain terminals (e.g., the source-drain terminal at supply voltage VAAPIX) of source follower transistor 52. The coupling effects may appear similarly for pixels in the same pixel row and may therefore be row-wise noise. Additional sources of parasitic capacitance C1 may also exist in pixel 22.

Power supply 51 may be separate from booster circuitry 38, but coupled to a separate booster circuit. If desired, power supply 51 may be formed in any suitable configuration. Supply voltage signal VAAPIX may include noise 62 (e.g., power supply noise) from a corresponding power supply (e.g., an external power supply). Noise from power supply 51 in supply voltage signal VAAPIX may propagate (in the direction of arrow 64) as unwanted noise to floating diffusion region 54 through parasitic capacitor 58 leading to unwanted noise at floating diffusion region 54.

The unwanted noise at floating diffusion region 54 may be read out during reset voltage level readout to produce a reset signal with unwanted noise. The unwanted noise at floating diffusion region 54 may also be read out during an image signal voltage level readout to produce an image signal with unwanted noise. The unwanted may contaminate both signals or completely overshadow the one or both of the signals.

Noise cancellation signal RSTG (sometimes referred to herein sometimes as noise rejection signal RSTG, also used as a reset transistor control signal) may be provided to the gate terminal of reset transistor 50. In other words, signal RSTG may be used both as a control signal for transistor 50 and as a noise cancellation signal. Noise cancellation signal RSTG controls transistor 50 to allow a portion of reset signal RSTD to pass to floating diffusion 54.

Noise cancellation signal RSTG may have inverted noise 66, which has an opposite amplitude (e.g., inverted amplitude) at any given time relative to noise 62 within supply voltage signal VAAPIX. Opposite and inverted may be used herein to denote the opposing signs (e.g., positive and negative signs) of two voltages or signals (e.g., 0.1V with respect to −0.1V, −0.25V with respect to 0.25V, etc.). Alternatively, inverted noise 66 may have an opposite and scaled amplitude at any given time relative to noise 62 within supply voltage signal VAAPIX. Because inverted noise 66 is within signal RSTG, inverted noise 66 may be correlated to the portion of reset signal RSTD that is passed to floating diffusion 54. In other words, noise cancellation signal RSTG may be propagated (in the direction of arrow 68) through the capacitive coupling between the gate terminal and one of the source-drain terminals (e.g., source-drain terminal coupled to floating diffusion region 54) of reset transistor 50. If desired, the capacitive coupling factors between the gate terminal and the source-drain terminal coupled to floating diffusion region 54 may be determined analytically or using any other suitable technique.

When inverted noise 66 is propagated to floating diffusion region 54 it may have an exactly inverted signal to noise 62 propagated to floating diffusion region 54 at any given time. For example, at a given time, if noise 62 that has propagated to floating diffusion region 54 is at a voltage level of 0.1V, inverted noise 66 that has propagated to floating diffusion region 54 is at a voltage level of −0.1V. Since the gate and drain/source coupling for different transistors (e.g., transistor 50 and transistor 52) may vary, the inverted noise component within signal RSTG may not necessarily have an exactly opposite amplitude of the power supply noise component of signal VAAPIX at another given time. Alternatively, the inverted noise component within RSTG may have an opposite amplitude of the power supply noise component of signal VAAPIX at the another given time. Any method may be used to determine a correct inverted noise within signal RSTG to cancel out the power supply noise component that has been propagated to floating diffusion 54.

Figure 5:
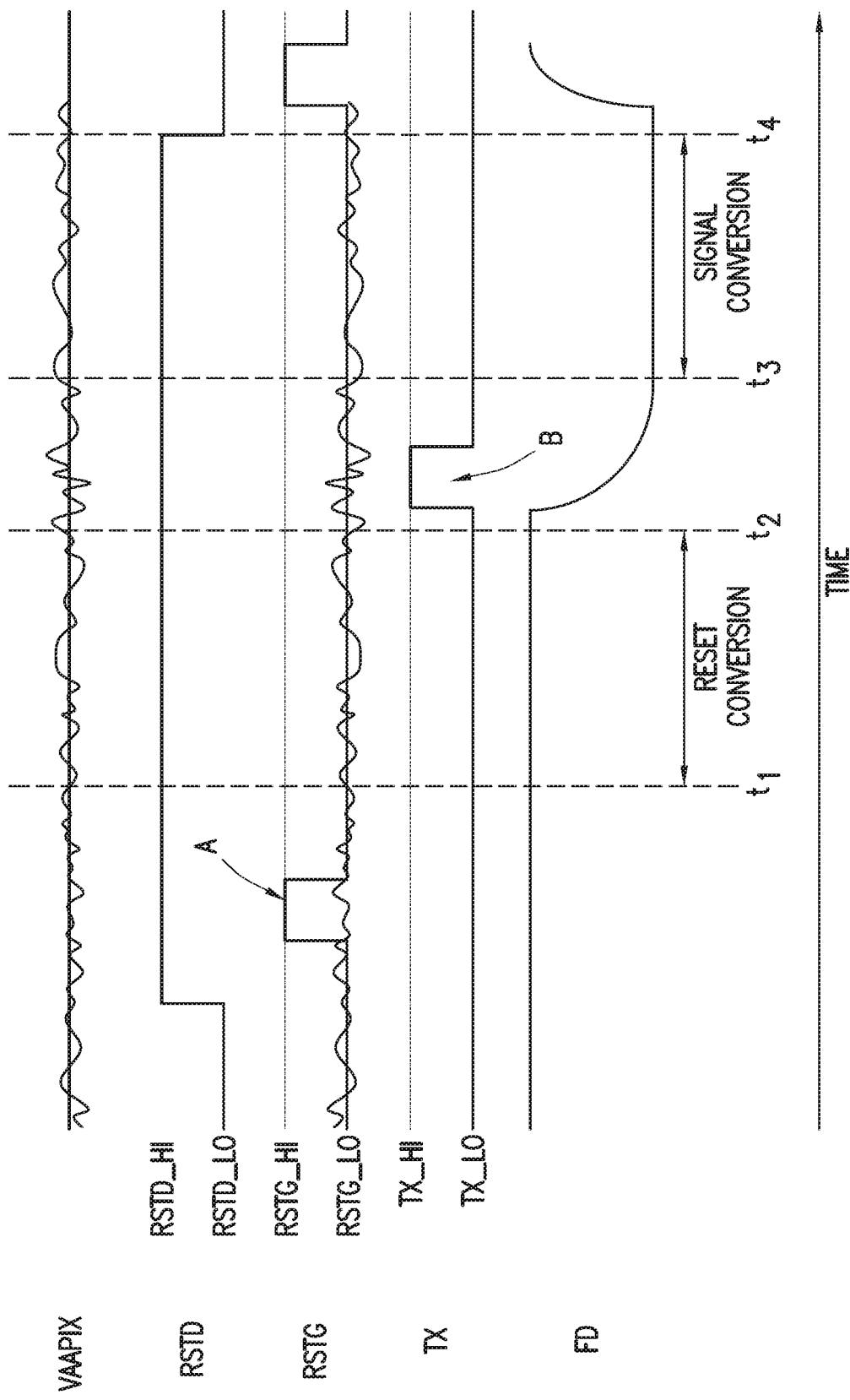
FIG. 5 is an illustrative timing diagram for operating an image pixel of the type shown in FIG. 4 having a noise canceling signal as an input in accordance with an embodiment.

When noise 66 is propagated to floating diffusion region 54 and summed with noise 62, noise 62 and 66 cancel out, removing any unwanted noise (e.g., unwanted power supply noise) from floating diffusion region 54. FIG. 5 is an illustrative timing diagram for operating pixel 22 of the type in FIG. 4 with power supply noise in signal VAAPIX and inverted noise in signal RSTG. Some operation timing of pixel 22 (e.g., timing of shuttering operation, etc.) are omitted to prevent unnecessarily obscuring the present invention.

In FIG. 5, from time $t_1$ to $t_2$, a reset signal may be read out (e.g., by using a source follower transistor and/or a row select transistor, or any other readout circuitry) as PIXOUT on output line 56. Prior to time $t_1$, floating diffusion region 54 may be reset as previously described (e.g., assertion signal A). From time $t_3$ to $t_4$, an image signal may be read out (e.g., by using a source follower transistor and/or a row select transistor, or anything other readout circuitry) as PIXOUT on output line 56. Prior to time $t_3$, accumulated charges at photodiode 46 during a corresponding exposure period may be transferred to floating diffusion region 54 (e.g., assertion signal B).

FIG. 5 shows signal VAAPIX with a noise component (e.g., noise 62) and signal RSTG with an inverted noise component (e.g., inverted noise 66). Inverted noise 66 may be present when signal RSTG is at a low state (e.g., state RSTG_LO). Unwanted noise is reduced at floating diffusion region 54 during both reset conversion operation and signal conversion operation. Therefore, signals read out from pixel 22 are unaffected by power supply noise. Furthermore, unwanted noise at floating diffusion region 54 is reduced when inverted noise cancellation is implemented (e.g., when noise rejection is implemented). During assertion signals A and B, inverted noise cancellation may be temporarily paused because inverted noise cancellation may occur when signals are at logic lows (e.g., when signals are deasserted).

Figure 6:
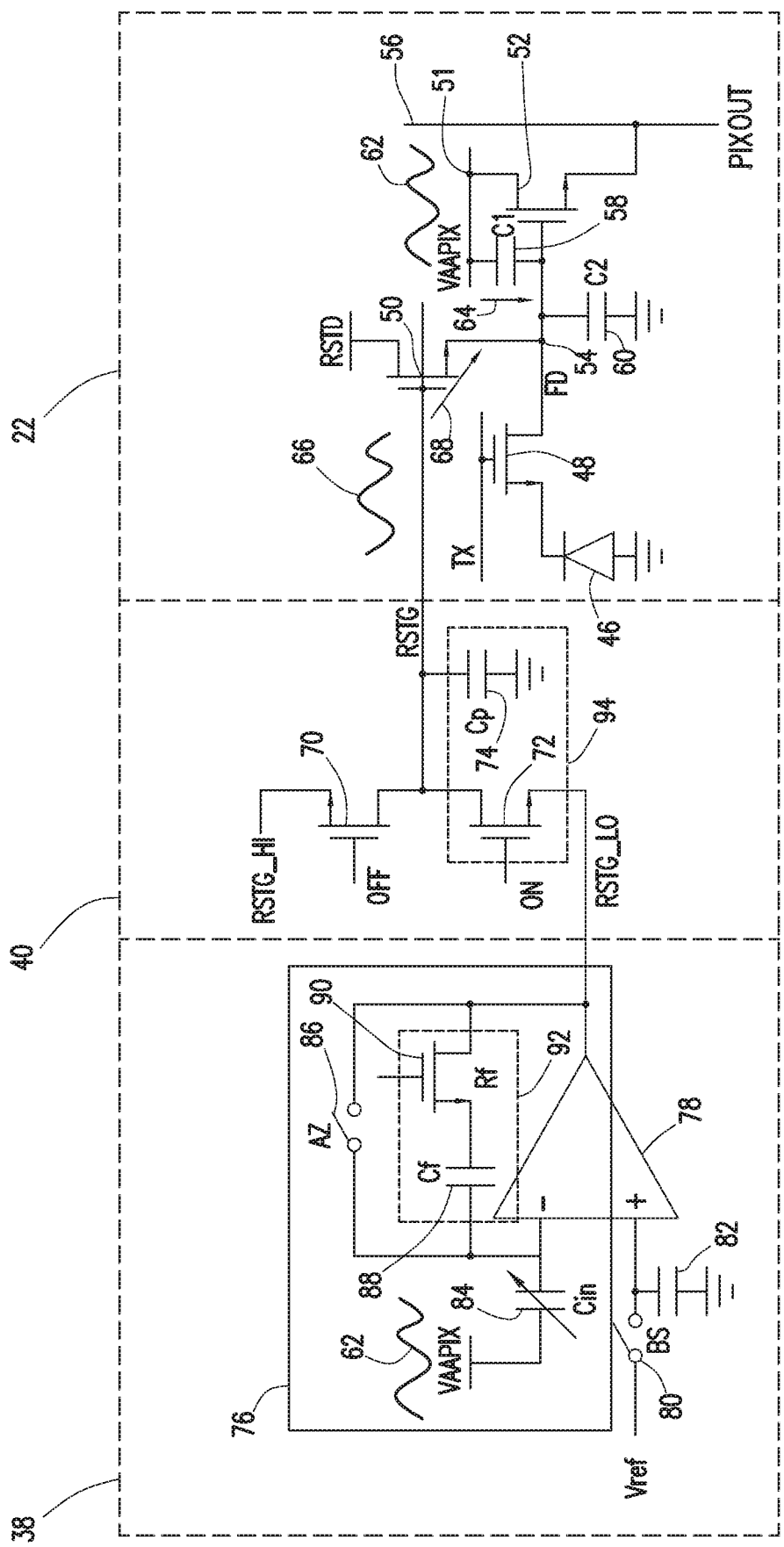
FIG. 6 is a circuit diagram of an illustrative booster circuit coupled to an image pixel of the type shown in FIG. 4 in an open-loop implementation in accordance with an embodiment.

Because booster circuitry 38 may provide control signal RSTG to pixel 22, booster circuitry 38 may include circuitry that generates noise cancellation signal RSTG having inverted noise 66. FIG. 6 is an illustrative circuit diagram that implements power supply noise cancellation circuitry within booster circuitry 38 in an open-loop implementation. An open-loop implementation may be a configuration in which there are tunable parameters that are intentionally (e.g., manually) adjusted to achieve application-specific goals (e.g., parameters are not self-adjusting).

As discussed in connection with FIG. 2, pixel 22 may be coupled to booster circuitry 38 via row driver circuitry 40. More specifically, noise cancellation signal RSTG (also referred to as control signal RSTG) may be coupled to switches 70 and 72 within row driver circuitry 40. Switch 70 may be enabled (e.g., closed) to provide RSTG with a control signal at a logic high (e.g., signal RSTG_HI). Switch 72 may be enabled (e.g., closed) to provide RSTG with a control signal at a logic low (e.g., signal RSTG_LO). Switch 72 may have an inherent resistance Rs. A data line providing signal RSTG may also have a parasitic capacitance produced by parasitic coupling to circuitry in its proximity (e.g., routing capacitance, pixel loading capacitance). The parasitic capacitance is shown as capacitor 74 with capacitance Cp. Capacitor 74 may be coupled between the gate terminal of transistor 50 and an additional ground voltage terminal.

Booster circuitry 38 may provide signals RSTG_HI and RSTG_LO to row driver circuitry 40 using high booster circuitry and low booster circuitry, respectively. The implementation of high booster circuitry is omitted as to not obscure the present invention. One of ordinary skill in the art would understand that any desired implementation of booster circuitry 38 to produce a suitable signal RSTG may be used. As an example, in the embodiment of FIG. 6, signal RSTG is implemented as a noise cancellation signal when noise cancellation signal RSTG_LO is used as signal RSTG, as determined within row driver circuitry 40. If desired, a configuration, in which other signals also include noise cancellation signals, may be also be implemented.

As shown in FIG. 6, low booster circuitry within booster circuitry 38 may include operational amplifier 78 (sometimes referred to herein as op-amp 78) and noise cancellation circuitry 76 coupled between a first input (e.g., a negative input terminal) and an output terminal of op-amp 78. Capacitor 82 may be coupled between a second input (e.g., a positive input terminal) of op-amp 78 and a ground voltage terminal. Bias sampling switch 80 may be couple capacitor 82 and the second input of op-amp 78 to reference voltage Vref. In combination, capacitor 82 and bias sampling switch 80 may be used to reduce noise (e.g., amplifier noise, internal noise) from reference voltage signal by disabling switch 80 (e.g., open switch 80) just before readout (referred to as bias sampling).

Noise cancellation circuitry 76 may have an input coupled to power supply voltage VAAPIX with noise 62. The input of noise cancellation circuitry 76 may be coupled to the negative input terminal of op-amp 78 via an input capacitor 84 with a tunable capacitance Cin. Noise cancellation circuitry 76 may include auto-zero switch 86 coupled between the negative input terminal and the output terminal of op-amp 78. Noise cancellation circuitry 76 may also include capacitor 88 and switch 90 coupled in series between the negative input terminal and the output terminal of op-amp 78. Auto-zero switch 86 may be coupled in parallel with capacitor 88 and switch 90. Capacitor 88 may have a capacitance Cf that matches the capacitance or the scaled capacitance of capacitor 74 within row driver circuitry 40.

Switch 90 may have a resistance that matches the resistance or the scaled resistance of switch 72 within row driver circuitry 40. In addition, the time constant of the capacitor 74 and resistor 72 combination may match the time constant of the capacitor 88 and resistor 90 combination in order to cancel low pass filtering effects caused by capacitor 74 and resistor 72.

In order to generate power supply noise cancellation signal RSTG_LO, input capacitor 84, feedback capacitor 88, auto-zero switch 86 are implemented in a feedback loop configuration in combination with op-amp 78, as in the previously discussed configuration. Power supply voltage signal VAAPIX is used as an input to input capacitor 84. When auto-zero switch 86 is enabled (e.g., closed), a unity buffer is configured and the output terminal of op-amp 78 has a signal Vref (when switch 80 is closed). In this operating mode, noise cancellation circuitry 76 has no noise cancellation capabilities (e.g., no noise rejection capabilities). When auto-zero switch 86 is disabled (e.g., opened), an inverting amplifier for an alternating current (AC) component of power supply voltage is configured and noise cancellation (e.g., noise rejection) is enabled. The inverting amplifier has a gain of –Cin/Cf. Portion 92 within noise cancellation circuitry 76 may be made to replicate portion 94 within row driver circuitry. More specifically, filtering resistance Rf, which corresponds to (e.g., is equivalent to) switch resistance Rs of switch 72, is used to generate a high pass filter to the transfer function of the inverting amplifier to cancel out the low pass filter effect of portion 94.

An exemplary transfer function from the power supply providing signal VAAPIX to signal PIXOUT on bus line 56 is shown below. All of the parameter may be estimated or tuned to obtain a noise cancellation effect at signal PIXOUT. If desired, Cin may be specifically tuned for noise cancellation effect.

$$\Delta PIXOUT = -\frac{Cin}{Cf} \cdot \frac{1 + Rf \cdot Cf \cdot s}{1 + Rs \cdot Cp \cdot s} \text{Gain}(RSTG \rightarrow PIXOUT) \cdot \Delta VAAPIX +$$

$$\text{Gain}(VAAPIX \rightarrow PIXOUT) \cdot \Delta VAAPI$$

The Gain(RSTG→PIXOUT)·ΔVAAPIX term is used to quantize the propagation from signal RSTG to signal PIXOUT when there is a perturbation (e.g., power supply noise) in signal VAAPIX. The Gain(VAAPIX→PIXOUT)·ΔVAAPIX term is used to quantize the propagation from signal VAAPIX to signal PIXOUT when in there is perturbation (e.g., power supply noise) in signal VAAPIX. ΔVAAPIX is a change in the amplitude of signal VAAPIX. ΔPIXOUT is a change in the amplitude of signal PIXOUT. Gain(RSTG→PIXOUT) is a voltage gain (e.g., a ratio of voltage at an output to voltage at an input) of propagating a signal from an input to an output using gate terminal of transistor 50 as the input terminal and signal output line 56 as the output terminal. Gain(VAAPIX→PIXOUT) is a voltage gain (e.g., a ratio of voltage at an output to voltage at an input) of propagating a signal from an input to an output using the terminal at which signal VAAPIX is provided to transistor 52 as the input terminal and signal output line 56 as the output terminal. s is the state variable in the frequency domain that represents an operating frequency. Other terms were discussed previously in connection with FIG. 6.

Figure 7:
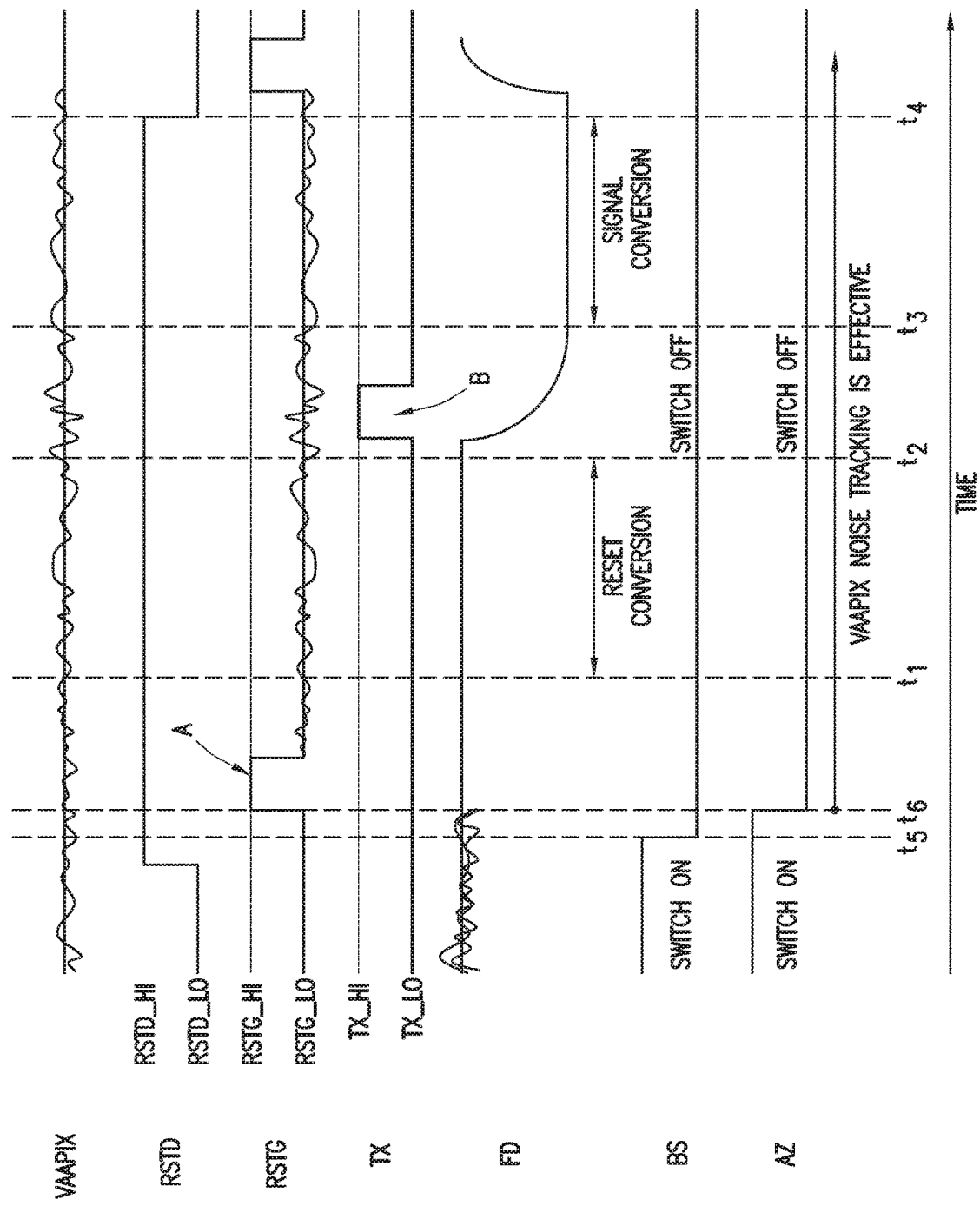
FIG. 7 is an illustrative timing diagram for operating a booster circuit of the type shown in FIG. 6 in accordance with an embodiment.

FIG. 7 is an illustrative timing diagram for operating a circuitry of the type shown in FIG. 6, where pixel 22 is coupled to booster circuitry 38 via row driver circuitry 40. Some operation timing of the circuit including pixel 22 (e.g., timing of shuttering operation, etc.) are omitted to prevent unnecessarily obscuring the present invention. Some features of FIG. 7 (e.g., assertion signals A and B, operation at times $t_1$, $t_2$, $t_3$, and $t_3$) were previously described in connection with features for FIG. 5. The details of these previously described features are omitted if these features perform similar analogous functions.

Signals BS and AZ that control bias sampling switch 80 and auto-zero switch 86, respectively, are shown in FIG. 7. At time $t_5$, bias sampling switch 80 may be switched off (e.g., opened) by deasserting signal BS just before read out and disabling auto-zero switch 86 to enable bias sampling (as previously discussed in FIG. 6). At time $t_6$, auto-zero switch 86 may be switched off (e.g., opened) by deasserting signal AZ. Prior to opening auto-zero switch 86, signal RSTG (e.g., using signal RSTG_LO) may have no inverted noise 66. After opening (e.g., disabling) auto-zero switch 86, inverted noise 66 may be generated on signal RSTG (e.g., using signal RSTG_LO). Therefore, unwanted noise may be propagated to floating diffusion region 54 prior to time $t_6$ and unwanted noise may be reduced (e.g., canceled out) after time $t_6$. Reset conversion and signal conversion operations may occur after time $t_6$ and may have reduced power supply noise.

Figure 8:
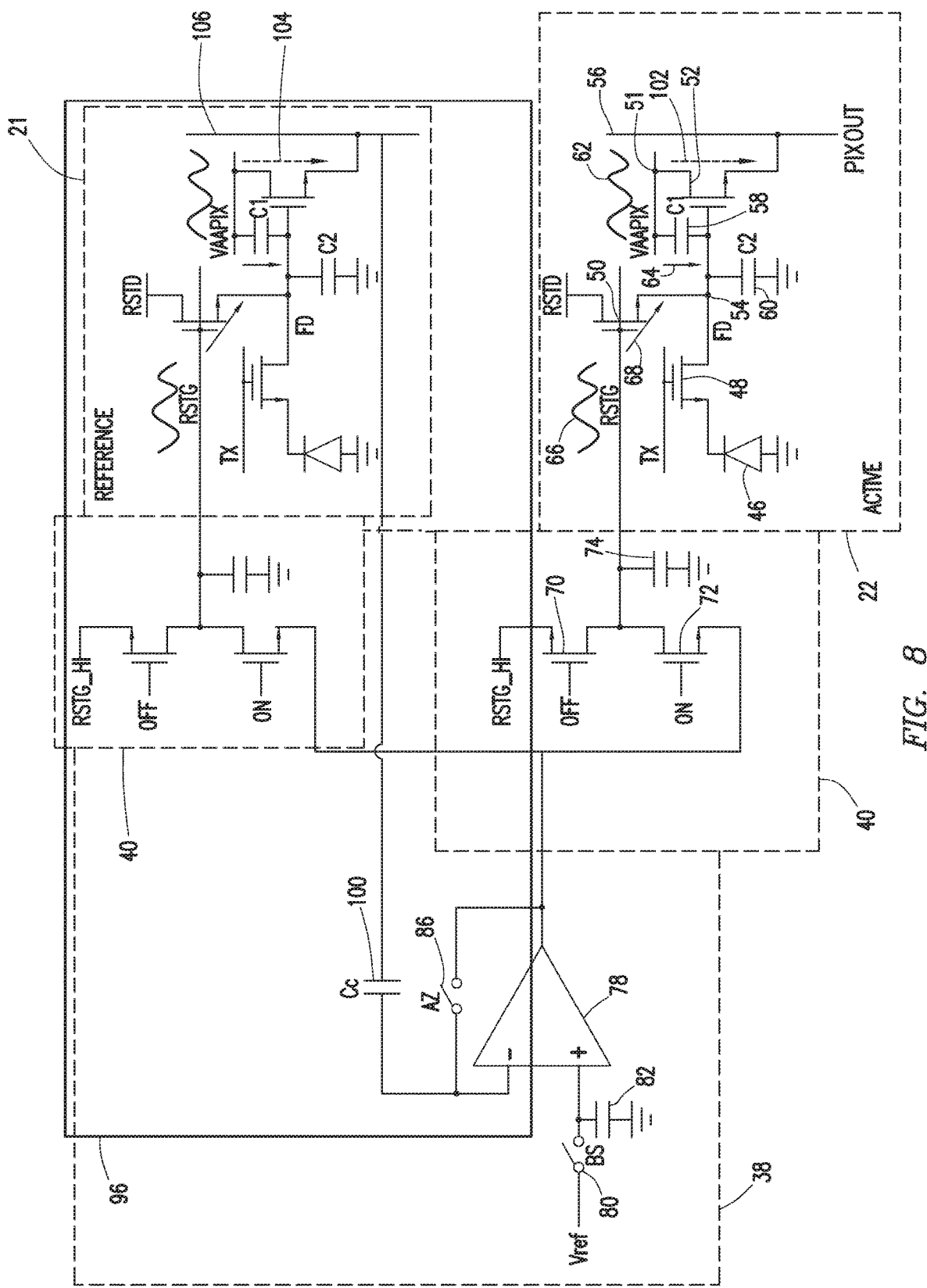
FIG. 8 is a circuit diagram of an illustrative booster circuit coupled to an image pixel of the type shown in FIG. 4 in a close-loop implementation in accordance with an embodiment.

FIG. 8 is an illustrative circuit diagram that implements power supply noise cancellation circuitry within booster circuitry 38 in a closed-loop implementation. A closed-loop implementation may be a configuration in which there are no tunable parameters to achieve application-specific means (e.g., parameters are self-adjusting).

FIG. 8 shows pixel 22, pixel driver circuitry 40, and booster circuitry 38, similar to FIG. 6. Some features of FIG. 8 (e.g., pixel 22, pixel driver circuitry 40, and parts of booster circuitry 38) were previously described in connection with features for FIG. 6. The details of these previously described features are omitted if these features perform similar analogous functions.

In the closed-loop implementation, booster circuitry 38 may include powers supply noise cancellation circuitry 96. Noise cancellation circuitry 96 may include an input from a reference pixel (e.g., dark pixel 21). As previously discussed in connection with FIG. 2, dark pixel 21 may be shielded from incident light and therefore not generate image signal corresponding to incident light. Dark pixel 21 may also be coupled to row driver circuitry 40 in order to have row driver circuitry 40 provide signal RSTG to dark pixel 21 similar to how row driver circuitry 40 is coupled to active pixel 22. In other words, signal RSTG may be provided to an analogous reset transistor within dark pixel 21. Dark pixel 21 and active pixel 22 may receive the same signals RSTG_HI and RSTG_LO from booster circuitry 38. Output line 106 of dark pixel 21 may be coupled to the negative input terminal of op-amp 78 via AC coupling capacitor 100 having capacitance Cc.

Implemented in this configuration, noise cancellation circuitry 96 may also account for additional parasitic coupling effects. For example, coupling between the source and drain terminals of transistor 52 (indicated by arrow 102) for pixel 22 may be cancelled out using the corresponding coupling within dark pixel 21 (indicated by arrow 104).

Instead of inverting power supply voltage signal VAAPIX as in the open-loop implementation, the output of dark pixel 21 (from output line 106), which contains pixel noise (e.g., power supply noise), may be directly coupled to the negative terminal of the op-amp 78. Dark pixel 21 may be replica of active pixel 22. This allows a feedback effect in which, all corresponding noise from dark pixel may be accounted for in the inverted noise 66 produced in signal RSTG_LO for active pixel 22. By adding dark pixel 21, parameters that are used to determine a desirable inverted noise 66 may be passively determined. In other words, the determination of the desirable inverted noise 66 may be hidden from a designer, since no parameters need to be manually adjusted.

Figure 9:
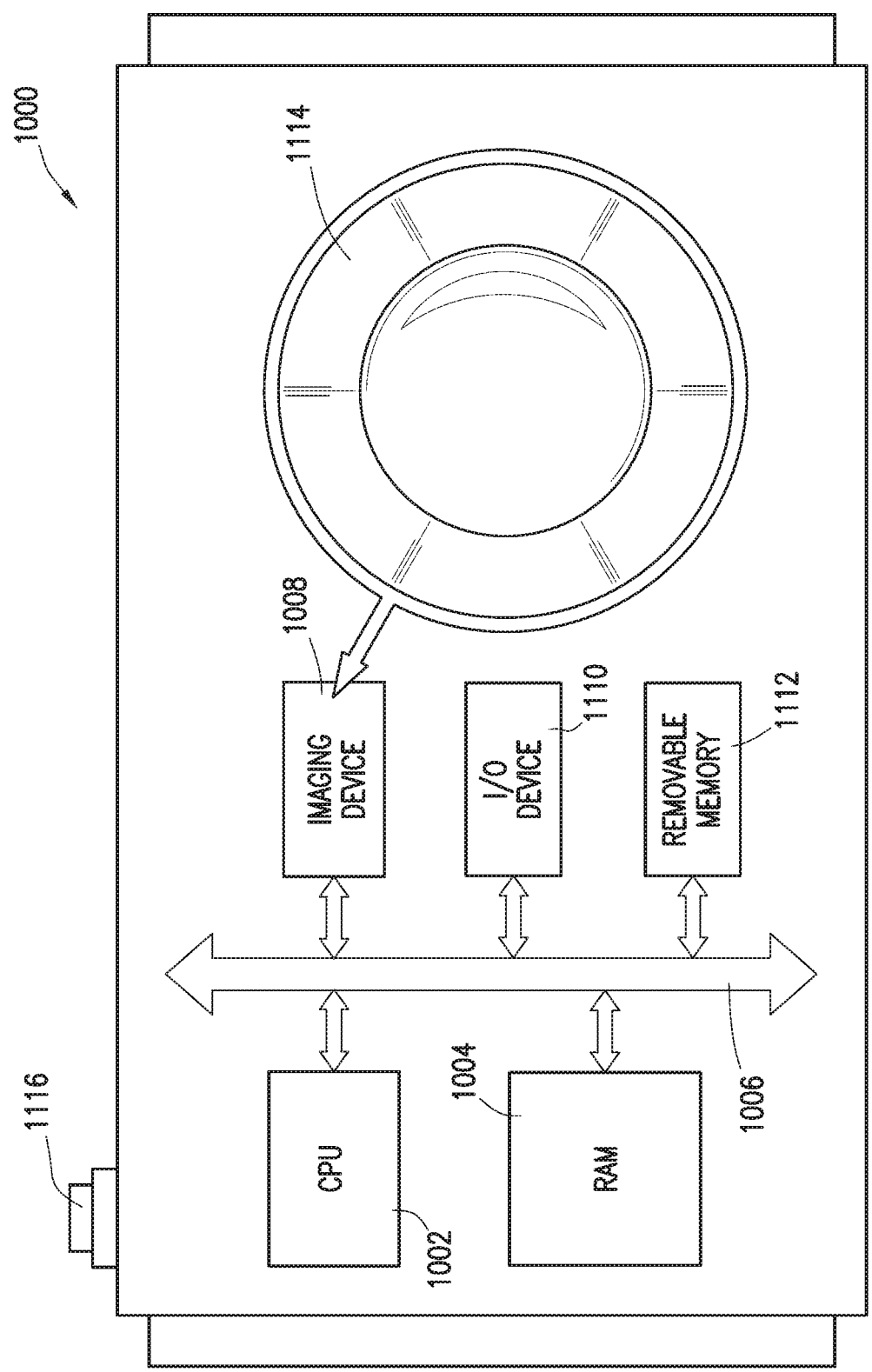
FIG. 9 is a block diagram of a processor system that may employ some of the embodiments of FIGS. 1-8 in accordance with an embodiment of the present invention.

FIG. 9 is a simplified diagram of an illustrative processor system 1000, such as a digital camera, which includes an imaging device 1008 (e.g., the camera module of FIG. 1) employing an imager having ADC circuitry as described above in connection with FIGS. 1-8. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 1000, for example a digital still or video camera system, generally includes a lens 1114 for focusing an image onto one or more pixel array in imaging device 1008 when a shutter release button 1116 is pressed and a central processing unit (CPU) 1002 such as a microprocessor which controls camera and one or more image flow functions. Processing unit 1102 can communicate with one or more input-output (I/O) devices 1110 over a system bus 1006. Imaging device 1008 may also communicate with CPU 1002 over bus 1006. System 1000 may also include random access memory (RAM) 1004 and can optionally include removable memory 1112, such as flash memory, which can also communicate with CPU 1002 over the bus 1006. Imaging device 1008 may be combined with the CPU, with or without memory storage on a single integrated circuit or on a different chip. Although bus 1006 is illustrated as a single bus, it may be one or more busses, bridges or other communication paths used to interconnect system components of system 1000.

Various embodiments have been described illustrating systems and methods for rejecting power supply noise in pixels of image sensors.

In one embodiment, an image sensor may include an array of pixels having an active pixel. The active pixel may generate image signals in response to incident light. The image sensor may also include a power supply and booster circuitry. The power supply may provide a powers supply voltage signal, which has a first noise component, to the active pixel. The booster circuitry may provide a control signal, which has a second noise component that is the inverted version of the first noise component, to the active pixel. The control signal with the second noise component may be used to reject the first noise component, which is an unwanted noise (e.g., power supply noise).

The booster circuitry may include an operational amplifier and capacitors and switches coupled to two input terminals and one output terminal of the operational amplifier in various configurations. As an example, a first capacitor may be coupled to a first input terminal of the operational amplifier. A second capacitor may be coupled to a second input terminal of the operational amplifier. A third capacitor may be coupled between the first input terminal and an output terminal of the operational amplifier. A first switch having a filtering resistance may be coupled in serious with the third capacitor. A second switch may be coupled between the first input terminal and the output terminal of the operational amplifier.

The image sensor may also include row driver circuitry that is coupled between the booster circuitry and the active pixel. The row driver circuitry may directly provide the control signal generated by the booster circuitry to the active pixel. The row driver circuitry may include a third switch having an inherent resistance and a fourth capacitor having a parasitic capacitance. The first switch having the filtering resistance may be a replica of the third switch with the inherent resistance. The third capacitor may have a capacitance that is the same as the parasitic capacitance.

The active pixel may include a photosensitive region, a floating diffusion region, a transfer transistor coupling the photosensitive region to the floating diffusion region, and a source follower transistor coupling the floating diffusion region to an output line. The active pixel may also include a reset transistor. The control signal generated by the booster circuitry may be provided to a gate terminal of the reset transistor. The reset transistor may couple the additional power supply to the floating diffusion region. The active pixel may further include a parasitic capacitor coupled between the floating diffusion region and the power supply providing the power supply voltage signal. The first noise component may propagate through the parasitic capacitor to the floating diffusion region and contaminate signals stored at the floating diffusion region. The second noise component may propagate through the terminals of the reset transistor and may be summed with the first noise component at the floating diffusion region to cancel out the first noise component.

In one embodiment, the array of image pixels may further include a dark pixel that is insensitive to the incident light. The dark pixel may generate reference signals and output them through its output line. The dark pixel may be coupled to the booster circuitry to generate the second noise component using the reference signals. The control signal generated by the booster circuitry may also be provided to a transistor within the dark pixel. In this embodiment, the booster circuitry may include an operational amplifier having first and second input terminals, and an output terminal. A first capacitor may be coupled to the first input terminal. The reference signals from the dark pixel may be coupled to the first terminal of the operational amplifier via the first capacitor. A second capacitor may be coupled to the second input terminal. A first switch may be coupled between the first input terminal and the output terminal. A second switch may be coupled to the second capacitor and the second input terminal.

In another embodiment, an image sensor may be operated with reduced noise. The image sensor may include a pixel within a pixel array, a row driver circuit, and a booster circuitry that is coupled to the pixel via the row driver circuit. A signal may be generated in response to incident light using a photodiode within pixel. The generated signal from the photodiode may be transferred to a floating diffusion within the pixel using a transfer transistor within the pixel. The generated signal transfer to the floating diffusion is summed with a power supply noise and stored as a combined signal at the floating diffusion. An inverted noise within a control signal may be transferred to the floating diffusion region using the control signal provided to a gate terminal of a transistor. The inverted noise may be summed with the combined signal to remove the power supply noise within the combined signal. The inverted noise within the control signal may be transferred to the floating diffusion when the control signal is at a logic low.

The booster circuit may further include an auto-zero switch. When the auto-zero switch is opened, the inverted noise within the control signal may be generated. The inverted noise has an opposite polarity to the power supply noise at any given time. The booster circuit may further include a bias sampling switch. Before opening the auto-zero switch, the bias sampling switch may be opened. To generate the inverted noise within the control signal, the power supply noise may be inputted into the booster circuit and the inputted power supply noise may be inverted using an inverting amplifier.

In yet another embodiment, a system may include a central processing unit, memory, a lens, input-output circuitry, an array of image sensor pixels arranged in rows and columns, and booster circuitry. The lens may focus image light onto the array of image sensor pixels. The image sensor pixels may be configured to generate analog image signals in response to image light. A given image sensor pixel within the array of image sensor pixels may generate a given analog image signal with noise. The booster circuitry may be coupled to the given pixel to provide the given pixel with a control signal for a transistor within the given pixel. The control signal may include a noise cancelation signal used to remove the noise within the given analog image signal.

The booster circuitry may be operable in two modes of operations. In a first mode of operation, the booster circuitry may generate the control signal including the noise cancelation signal used to remove the noise. In a second mode of operation, the booster circuitry may generate the control signal without including the noise cancelation signal used to remove the noise. The array of image sensor pixels may include a reference pixel that is shielded form image light. The reference pixel may be coupled to the booster circuitry. The reference pixel may provide a reference signal to the booster circuitry in order to generate the noise cancelation signal.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
   a pixel in an array of pixels, wherein the pixel is operable to generate image signals in response to receiving incident light;
   power supply circuitry coupled to the pixel and configured to provide a voltage signal to the pixel, wherein the voltage signal has a first noise component; and
   control circuitry coupled to the pixel and configured to provide a control signal to the pixel, wherein the control signal has a second noise component generated based on the first noise component.

2. The image sensor defined in claim 1, wherein the pixel includes a transistor controlled by the control signal.

3. The image sensor defined in claim 1, wherein the second noise component is an inverted version of the first noise component.

4. The image sensor defined in claim 1, wherein the second noise component is configured to remove the first noise component from the pixel.

5. The image sensor defined in claim 1, wherein the pixel includes a source-follower transistor configured to receive the voltage signal.

6. The image sensor defined in claim 1, wherein the control circuitry includes booster circuitry and row driver circuitry interposed between the booster circuitry and the pixel and wherein the booster circuitry is configured to generate the control signal having the second noise component based on the first noise component.

7. The image sensor defined in claim 6, wherein the row driver circuitry directly provides the control signal to the pixel.

8. The image sensor defined in claim 6, wherein control signal is configured to have a high value and a low value and the low value includes the second noise component.

9. The image sensor defined in claim 1, wherein the pixel includes a floating diffusion region, the first noise component in the voltage signal propagates to the floating diffusion region.

10. The image sensor defined in claim 9, wherein the second noise component in the control signal propagates to the floating diffusion region, wherein the first noise component has a first amplitude at any given time, and wherein the second noise component has a second amplitude that is an inverted version of the first amplitude at the same given time and the first and second noise components are summed at the floating diffusion region.

11. The image sensor defined in claim 1, further comprising:
   a dark pixel within the array of pixels, wherein the dark pixel is configured to generate a reference signal and the second noise component is generated based on the reference signal.

12. The image sensor defined in claim 1, wherein the control circuitry comprises:
   an operational amplifier that has a first input terminal, a second input terminal and an output terminal; and
   a capacitor coupled between the first input terminal and the power supply circuitry configured to provide the voltage signal.

13. A method of operating an image sensor that includes a pixel and control circuitry coupled to the pixel, wherein the control circuitry comprises row control circuitry, the method comprising:
   with a photodiode in the pixel, generating an image signal in response to incident light;
   at a floating diffusion region in the pixel, receiving a power supply noise;
   with the control circuitry, providing a noise cancelation signal to the pixel;
   with the noise cancelation signal, removing the power supply noise;
   at the row control circuitry, receiving the power supply noise; and
   with the row control circuitry, generating the noise cancelation signal based at least in part on inverting the received power supply noise.

14. The method defined in claim 13, wherein the pixel includes a transistor and the noise cancelation signal comprises a control signal received by the transistor.

15. The method defined in claim 13, wherein removing the power supply noise comprises receiving the inverted version of the power supply noise at the floating diffusion region.

16. A method of operating an image sensor that includes a pixel and control circuitry coupled to the pixel, the method comprising:
   with a photodiode in the pixel, generating an image signal in response to incident light;
   at a floating diffusion region in the pixel, receiving a power supply noise;
   with the control circuitry, providing a noise cancelation signal to the pixel;

with the noise cancelation signal, removing the power supply noise; and generating the noise cancelation signal based on an inverted version of the power supply noise.

* * * * *